United States Patent

[11] 3,568,863

| [72] | Inventors | Helmut Rohwedder<br>Mittelbach;<br>Eberhard Podleska, Bierbach; Kurt Buhler, Zweibrueken, Germany |
|---|---|---|
| [21] | Appl. No. | 838,797 |
| [22] | Filed | July 3, 1969 |
| [45] | Patented | Mar. 9, 1971 |
| [73] | Assignee | Deere & Company<br>Moline, Ill. |
| [32] | Priority | Dec. 4, 1968 |
| [33] | | Germany |
| [31] | | P 18 12 571.8—23 |

[54] SAFETY SHIELD FOR COMBINE GRAIN TANK AUGER
6 Claims, 7 Drawing Figs.

[52] U.S. Cl. .................................................. 214/83.32, 198/64, 198/213

[51] Int. Cl. ........................................................ B60p 1/40
[50] Field of Search ............................................ 214/83.32, 17.6; 198/213—216, 64; 56/190

[56] References Cited
UNITED STATES PATENTS

| 3,077,972 | 2/1963 | Mitchell | 198/64 |
| 3,251,453 | 5/1966 | Robson, Jr. | 198/213X |

*Primary Examiner*—Albert J. Makay
*Attorneys*—H. Vincent Harsha, Harold M. Knoth, William A. Murray and John M. Nolan ABSTRACT: A safety shield is provided for the grain tank, for example, of a combine so as to protect the operator from injury. The shield is yieldably mounted so that it can move away from the auger in response to the pressure of accumulating grain.

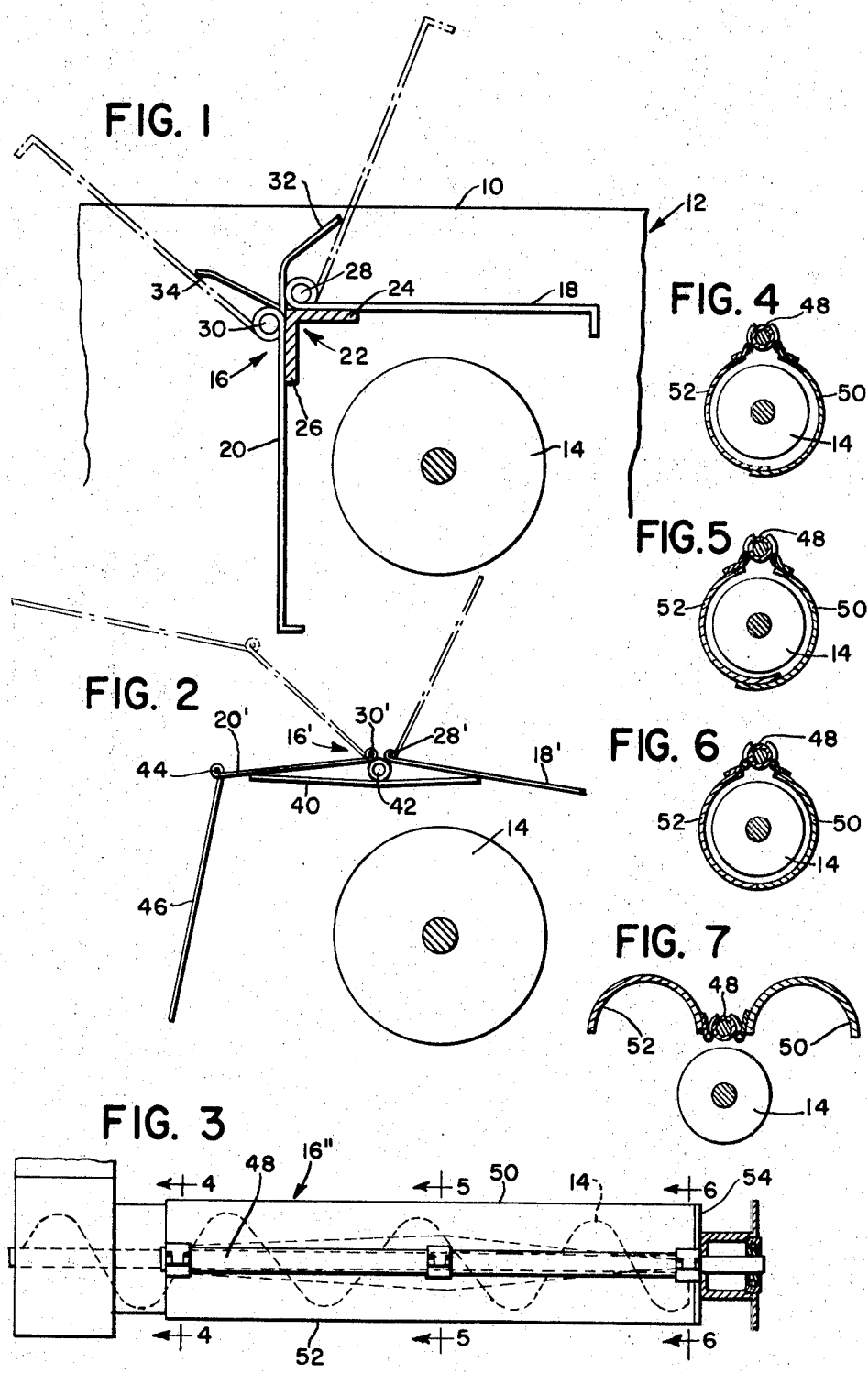

SAFETY SHIELD FOR COMBINE GRAIN TANK AUGER

BACKGROUND OF THE INVENTION

The invention relates to a safety device for the distributor auger in the grain tank of combines, said device covering the distributor auger at least on one of its longer sides, for example the longer side facing the driver's position in the case of self-propelled combines.

A known safety device of the above type is in the form of a half-bowl and is disposed substantially above the upper side of the auger. Another known safety device consists of wire grids and angularly surrounds the auger. These known safety devices impair the desired distribution of the grain material and particularly in the case of damp grain are easily bent by the accumulation pressure between the safety device and the auger.

SUMMARY OF THE INVENTION

The problem to be solved by the invention consists in providing a more advantageous construction and arrangement of the safety device. This problem is solved according to the invention by arranging the safety device to be movable in dependence on the grain pressure. In this way the material no longer accumulates and can easily be distributed by pushing away the safety device.

More specifically, according to the invention the safety device is pivoted in the grain tank about at least one axis extending parallel to the longitudinal axis of the auger and preferably includes two hinged flaps, the hinge axes of which may extend parallel to the longitudinal axis of the auger.

It is thereby ensured that, for example in the case of self-propelled combines, the driver of the combine cannot reach the auger from the driving position if the hinge axis or axes is or are disposed above the auger, referred to the surface on which the combine stands.

The range of movement of the safety device is advantageously capable of being limited by stops.

With regard to details of construction, the parts or the hinge flaps of the safety device are adapted to bear against at least one angle iron having a vertical leg and a horizontal leg. The hinge flaps of the safety device are adapted to be pivotally connected to the vertical and horizontal legs respectively.

In another embodiment of the invention, the hinged flaps may, however, also be disposed in roof form above the auger.

In order to cover the auger again when the grain tank has been or is being emptied, the safety device may be arranged to swing back automatically into its position of rest.

When the safety device is disposed in roof form, the hinged flaps may be connected to a carrier extending above the auger, while a cover plate is hinged to the flap facing the driver's position. In this arrangement the hinged flaps when in their position of rest lie against a plate joined to the carrier.

On the other hand, it is, however, also possible for the hinged flaps of the safety device to form a tube surrounding the auger.

Because the hinged flaps, which are in the form of half-tubes, surround the auger with different overlaps, controlled filling of the grain tank is made possible in addition to protection of the auger. More specifically, the overlap of the half-tubes is smallest at the outlet end of the auger and largest in the middle region of the auger.

BRIEF DESCRIPTION OF THE DRAWINGS

FIG. 1 illustrates diagrammatically the safety device according to the invention;

FIG. 2 illustrates another example of the safety device;

FIG. 3 illustrates a third example of the safety device;

FIG. 4 is a section along the line 4—4 in FIG. 3;

FIG. 5 is a section along the line 5—5 in FIG. 3;

FIG. 6 is a section along the line 6—6 in FIG. 3; and

FIG. 7 illustrates the safety device shown in FIG. 3 when the grain tank is full.

DESCRIPTION OF THE PREFERRED EMBODIMENTS

In FIG. 1, 10 designates the upper boundary of a grain tank 12 which is mounted in the usual manner on a combine, which for the sake of simplicity is not shown, and in its upper region is provided with a distributor auger 14. The purpose of the latter is to distribute in the grain tank 12 the material fed to it in the usual manner by an elevator, which is likewise not shown, the material then being discharged from said grain tank by means of an emptying auger (also not shown). Referred to the drawing, in the case of self-propelled combines the driver's position with the driver's seat and steering wheel is provided on the left in front of the grain tank.

In order to prevent the possibility of the driver coming into contact with the auger 14 from the driving position, whereby accidents could be caused, for example through the winding of garments around the auger, a safety device 16 is provided. More specifically, this device includes hinged flaps 18, 20 which in turn are connected for vertical pivoting to an angle iron 22 connected to the sidewalls of the grain tank 12. The angle iron is provided with a horizontal leg 24 and a vertical leg 26, so that the hinged flaps, which in their position of rest lie against said legs, are disposed horizontally and vertically and thus cover the auger both along its longer side facing the driver and also on its upper side. The hinged flaps themselves may be made of sheet metal, wire grids, or the like, and are connected to the angle iron 22 in the region of its apex by means of hinges 28, 30.

As can also be seen from the drawing, referred to the surface on which the combine stands and to its direction of travel, the hinges are disposed above and in front of the auger 14, but parallel to the latter, so that the hinged flaps can be swung out of their position of rest, which is shown in solid lines in the drawing, into the swung-out position shown in dot-and-dash lines. This swinging movement takes place when the grain tank is full, since the grain transported by the auger swings the flaps about the hinges 28, 30 in such a manner that even when they are in the swung-out position they make access to the auger very difficult for the driver. The swung-out position of the hinged flaps 28 can be fixed by stops 32, 34, which are provided on the angle iron 22 or on the sides of the grain tank, in such a manner that the hinged flaps return automatically by gravity to the position of rest when the grain tank is emptied.

In another embodiment, which is illustrated in FIG. 2, the safety device 16' when in its position of rest, which is shown in solid lines in the drawing, lies on a support 40 which, like the hinges 28' and 30' of the safety device, is disposed on a rod 42 extending parallel to the auger 14. In this embodiment also the safety device 16' is provided with hinged flaps 18' and 20', but in contrast to the embodiment illustrated in FIG. 1 these flaps cover the auger 14 in roof form. In addition, the flap facing the driver's position is also connected by another hinge 44 to a cover plate 46 which in the position of rest covers the side of the distributor auger 14 facing the driver.

When the level of grain rises in the grain tank 12, the hinged flaps 18' and 20' and also the cover plate 46 are swingable about their axes until they reach approximately the position shown in broken lines in FIG. 2. In this end position it is also ensured that the driver of the combine cannot reach into the auger 14.

FIGS. 3 to 7 illustrate a third example of construction of a safety device 16'', which consists more specifically of two half-tubes 50 and 52 hinged on a rod 48 extending parallel to and above the auger 14. Referred to FIG. 3, the safety device is closed at its right-hand end by a fixed plate 54. As can in addition be seen from FIGS. 4 to 6, the half-tubes are so constructed that at the beginning of the auger (FIG. 4) they overlap relatively slightly, while at the center of the auger (FIG. 5) they overlap considerably and at the end of the auger (FIG. 6) they abut against one another.

During the filling of the grain tank, the auger 14 delivers the material through the tube formed by the half-tubes 50 and 52 to the plate 54. The grain accumulates there and presses the half-tubes 50 and 52 apart. At the outlet end of the distributor auger there is thus formed a gap, through which the grain can enter the grain tank 12, while the remainder of the tube still remains closed in consequence of the varying overlap. Only when the grain reaches the distributor auger 14 at the outlet end will the tube be further opened, through the pressure on the plate 54 and the half-tubes 50, 52, in such a manner that it will open to form a gap also at the inlet end. Since with progressive opening of the side of the tube which is on the right in FIG. 3 the left-hand side will also open, the grain tank is first filled alternately on right and left until finally the tube also opens in the middle (FIG. 5). As the filling of the grain tank 12 then progresses, the half-tubes can be swung in the vertical direction until they assume the position shown in FIG. 7. This end position may be fixed by stops. By selection of the overlapping of the half-tubes the filling of the grain tank can be predetermined.

We claim:

1. In an agricultural machine having a crop-receiving receptacle and an auger disposed in crop-delivery relation thereto, the improvement comprising a support carried by the receptacle in proximity to the auger, a safety shield having a normal position closely overlying the auger, and means mounting the shield on the support for movement away from and back to said normal position according to increase and decrease of crop material between the auger and shield said shield including a pair of complementary halves at least partially embracing the auger from above, each half having a normal position closely overlying the auger, and the mounting means mounts the halves for independent swinging about at least one axis parallel to the auger axis.

2. The invention defined in claim 1 including stop means limiting movement of the shield away from said normal position to a protective status preventing access to the auger from at least one side thereof.

3. The invention defined in claim 1 including stop means limiting movement of the halves away from their normal positions to protective positions preventing access to the auger from at least one side and the top thereof.

4. The invention defined in claim 1, in which the shield halves are swingably mounted above the auger and are in the form of half-tubes having juxtaposed lower edges adapted to open and close in response to accumulation and decrease of crop material between the auger of said halves.

5. The invention defined in claim 4 in which said lower edges are so relatively shaped as to vary the amount of opening lengthwise thereof.

6. The invention defined in claim 5, in which the opening is greater midway between the ends of the auger than at the ends thereof.